(12) United States Patent
Baker et al.

(10) Patent No.: US 10,645,171 B1
(45) Date of Patent: May 5, 2020

(54) SYSTEM AND METHOD FOR NETWORK AND CUSTOMER DEVICE PROVISIONING

(71) Applicant: CSG Media, LLC, Chicago, IL (US)

(72) Inventors: Thomas Baker, Omaha, NE (US); Daniel Polley, Omaha, NE (US); Lisa Vandemark, Woodbine, IA (US); Sridhar Kannan, Omaha, NE (US)

(73) Assignee: CSG Systems, Inc., Greenwood Village, CO (US)

( * ) Notice: Subject to any disclaimer, the term of this patent is extended or adjusted under 35 U.S.C. 154(b) by 0 days.

(21) Appl. No.: 16/435,702

(22) Filed: Jun. 10, 2019

(51) Int. Cl.
*G06F 15/16* (2006.01)
*H04L 29/08* (2006.01)
*H04L 29/06* (2006.01)
*H04L 12/24* (2006.01)

(52) U.S. Cl.
CPC ........ *H04L 67/125* (2013.01); *H04L 65/4069* (2013.01); *H04L 65/80* (2013.01); *H04L 67/26* (2013.01); *H04L 67/303* (2013.01); *H04L 41/50* (2013.01)

(58) Field of Classification Search
CPC ..................................................... H04L 41/50
See application file for complete search history.

(56) References Cited

U.S. PATENT DOCUMENTS

| | | | | |
|---|---|---|---|---|
| 6,031,904 A * | 2/2000 | An | ..................... | H04M 3/42153 370/352 |
| 6,243,451 B1 * | 6/2001 | Shah | .................. | H04M 3/42136 370/352 |
| 8,447,279 B1 * | 5/2013 | Peng | ....................... | G06Q 30/00 455/414.1 |
| 2004/0248563 A1 * | 12/2004 | Ayers | ................. | H04M 3/42136 455/417 |
| 2007/0033275 A1 * | 2/2007 | Toivonen | ............ | G06F 16/9562 709/224 |
| 2007/0099609 A1 * | 5/2007 | Cai | ...................... | H04L 41/5054 455/428 |
| 2007/0180490 A1 * | 8/2007 | Renzi | .................... | G06F 21/577 726/1 |
| 2012/0327787 A1 * | 12/2012 | Mohammed | .......... | H04W 24/08 370/242 |
| 2013/0347025 A1 * | 12/2013 | Prakash | ............. | H04N 21/2541 725/25 |
| 2014/0073300 A1 * | 3/2014 | Leeder | ................. | H04B 5/0031 455/416 |
| 2014/0199962 A1 * | 7/2014 | Mohammed | .......... | H04M 15/70 455/406 |
| 2016/0044180 A1 * | 2/2016 | Ramprasad | ......... | H04M 15/723 455/414.1 |
| 2018/0063540 A1 * | 3/2018 | Zhu | ........................ | H04N 19/54 |
| 2019/0268380 A1 * | 8/2019 | Obaidi | .................... | H04L 63/20 |

* cited by examiner

*Primary Examiner* — Hieu T Hoang (74) *Attorney, Agent, or Firm* — Fitch, Even, Tabin & Flannery LLP (57) ABSTRACT

A desired end-state profile of an electronic media and services customer is received. At the control circuit, the desired end-state profile is applied to the data structure having the current in-state profile according to the set of electronic rules. The data structure is transformed to include the desired state. A network and/or devices are physically transformed to implement the desired end-state.

10 Claims, 7 Drawing Sheets

| | 421 | 422 | 423 | 424 | 425 | 426 | 427 | 428 | 429 |
|---|---|---|---|---|---|---|---|---|---|
| | BILLING CODE | SERVICE CODE | SID | PID | OFFER ID | DISCOUNT | TELEPHONE NUMBER | ACCOUNT | JOB NUMBER |
| 411 → | BASIC | BASIC | 1 | | 100 | | | 111111 | |
| 412 → | PREMIUM | PREMIUM | 2 | | 100 | | | 111111 | 1 |
| 413 → | TELEPHONE | TELEPHONE | 3 | | 200 | | 402-111-2222 | 111111 | 1 |
| 414 → | VOICE MAIL | VOICE MAIL | 4 | 3 | 200 | AA | 402-999-8888 | 111111 | 1 |
| 415 → | 2ND LINEPKG | TELEPHONE | 5 | | 200 | AA | 402-999-8888 | 111111 | 1 |
| 416 → | 2ND LINEPKG | VOICE MAIL | 6 | 5 | 200 | | | 111111 | 1 |

| | BILLING CODE | SERVICE CODE | SID | PID | OFFER ID | DISCOUNT | TELEPHONE NUMBER | ACCOUNT | JOB NUMBER |
|---|---|---|---|---|---|---|---|---|---|
| 502 → | BASIC | BASIC | 1 | | 100 | | | 111111 | |
| 504 → | DVR | DVR | 2 | | 100 | | | 111111 | |

| Item Id (629) | Service Code (630) | Package Code (632) | Offer Id (634) | Discount Id (636) |
|---|---|---|---|---|
| 1 | SC1 | SC1 | 123 | |
| 2 | SC2 | PK1 | 123 | |
| 3 | SC3 | PK1 | 123 | |
| 4 | SC4 | SC4 | 123 | DS1 |
| 5 | SC1 | SC1 | 456 | |
| 6 | SC2 | PK2 | 456 | |
| 7 | SC3 | PK2 | 456 | |
| 8 | SC4 | SC4 | 456 | |

FIG. 6

| Item Id (729) | Service Code (730) | Package Code (732) | Offer Id (734) | Discount Id (736) |
|---|---|---|---|---|
| 9 | SC1 | SC1 | | |
| 10 | SC4 | SC4 | | DS2 |
| 11 | SC1 | SC1 | 456 | |
| 12 | SC2 | PK3 | 456 | |
| 13 | SC3 | PK3 | 456 | |
| 14 | SC4 | SC4 | 456 | |
| 15 | SC5 | SC5 | | |

FIG. 7

| | End State Item Id | Existing Match Candidates | Best Match | Notes |
|---|---|---|---|---|
| 802 → | 9 | 1, 5 – SC1 | 1 | Item 1 picked since there is a better match for item 5 (end state item 11). Item 1 matched with offer id removed. |
| 804 → | 10 | 4, 8 – SC4 | 4 | Item 4 picked since there is a better match for item 8 (end state item 14). Item 4 matched with offer id removed and different discount code. |
| 806 → | 11 | 1, 5 – SC1 | 5 | Item 5 picked because it matches more key fields (offer id). Item 5 is an exact match on all key fields. |
| 808 → | 12 | 2, 6 – SC2 | 6 | Item 6 picked because it matches more key fields (offer id), note 6 is a better match even though both candidates do not match on package code. Item 6 matched with different package code. |
| 810 → | 13 | 3, 7 – SC3 | 7 | See notes for item 12 |
| 812 → | 14 | 4, 8 – SC4 | 8 | Item 8 picked because it matches more key fields (offer id). Item 8 is an exact match on all key fields |
| 814 → | 15 | None | None | No match found, service will be added |
| 616 → | | | 2 | No matches found for existing item 2, this will be removed |
| 818 → | | | 3 | No matches found for existing item 3, this will be removed |

| | Item Id (920) | Service Code (924) | Package Code (926) | Offer Id (928) | Discount Id (930) | Item State (932) |
|---|---|---|---|---|---|---|
| 902 → | 1 | SC1 | SC1 | | | Change – remove offer |
| 904 → | 2 | SC2 | PK1 | 123 | | Remove |
| 906 → | 3 | SC3 | PK1 | 123 | | Remove |
| 908 → | 4 | SC4 | SC4 | | DS2 | Change – remove offer, change discount |
| 910 → | 5 | SC1 | SC1 | 456 | | No Change |
| 912 → | 6 | SC2 | PK3 | 456 | | Change – change package |
| 914 → | 7 | SC3 | PK3 | 456 | | Change – change package |
| 916 → | 8 | SC4 | SC4 | 456 | | No Change |
| 918 → | 15 | SC5 | SC5 | | | Add |

*FIG. 9*

| | Item Id (1020) | Service Code (1022) | Package Code (1024) | Offer Id (1026) | Discount Id (1028) |
|---|---|---|---|---|---|
| 1002 → | 1 | SC1 | SC1 | | |
| 1004 → | 4 | SC4 | SC4 | | DS2 |
| 1006 → | 5 | SC1 | SC1 | 456 | |
| 1008 → | 6 | SC2 | PK3 | 456 | |
| 1010 → | 7 | SC3 | PK3 | 456 | |
| 1012 → | 8 | SC4 | SC4 | 456 | |
| 1014 → | 15 | SC5 | SC5 | | |

*FIG. 10*

SYSTEM AND METHOD FOR NETWORK AND CUSTOMER DEVICE PROVISIONING

TECHNICAL FIELD

This disclosure relates to provisioning electronic networks to conform to desired end-states.

BACKGROUND

Customers of electronic or media services have various options to choose. For example, they can subscribe to various services such as cable television, the internet, cellular phone, or other types of services. These services may be organized according to plans or presented as offers to customers. Customers can also choose parameters or settings related to these services. For instance, customers can in some cases choose the speed for data they are receiving.

Sometimes, a customer desires to change the services and/or parameters or settings of the services they are receiving. For example, the customer may wish to drop a cable television service or increase their internet data rate/speed.

BRIEF DESCRIPTION OF THE DRAWINGS

For a more complete understanding of the disclosure, reference should be made to the following detailed description and accompanying drawings wherein.

DETAILED DESCRIPTION

Generally speaking, approaches are provided where a control circuit disposed at a central location receives an end-state profile or order, which is the complete set of services desired by a customer. This may include newly desired services and/or existing services. At the central location, a data structure with the current customer profile or state is retrieved by the control circuit from a database. In addition, reconciliation rules are obtained from the database by the control circuit, and the desired end-state profile is applied to the current profile (stored in the data structure) according to the rules by the control circuit. Then, the control circuit forms instructions (or uses other electronic communications such as computer code) to alter, adjust and/or transform the operation of network elements in an electronic communication network (that is used to actually provide the services to the customer) or other electronic elements or devices (e.g., at the customer's premises) to provide the services and/or provide services according to the adjusted parameters.

In aspects, a customer submits an electronic order for the desired end-state (e.g., the desired services also referred to as the "end-state profile"). When processing the order, the system performs a reconciliation of the desired end-state sent to the system by the customer and the current state of the customer's services. In aspects, these approaches automatically, in real-time, and without human intervention identify the changes needed to submit on behalf of client applications calling the service. In some aspects, once the current state is evaluated against the desired end-state (indicated in the customer order), these approaches match to key fields in a billing system (e.g., codes or identifiers of services, customers, aspects of services, or other types of information) and generate a list of changes required to effectively conform the system to the requested end-state. The ability to use the same codes for both billing and provisioning is advantageous since it streamlines system operation leading to more efficient and cost-effective operations and accurate bills.

In other aspects, a single centralized system is provided that handles provisioning and billing. Because of the centralized architecture and the ability of a control circuit to perform different tasks simultaneously, the remote user can perform other tasks at the same time (in parallel) with the validation, provisioning, and invoicing activities. All the user has to do is enter the desired end-state and not be concerned with (or determine) the changes or differences between the end-state and their current state. Because of the centralized architecture and ability to share key fields for billing and provisioning purposes, the system operates faster and more efficiently since the reconciliation process is hidden from the user, does not require customer involvement, and system complexity is reduced.

In many of these embodiments, approaches for provisioning electronic elements are provided. A desired end-state profile of an electronic media and services customer is received at an electronic interface. The profile includes a set of electronic services desired to be utilized by the electronic media and services customer. This may include newly desired services and/or existing service subscribed to or utilized by the customer.

The desired end-state profile is transmitted to a control circuit that is disposed at a central location. The transmission occurs via a first electronic communication network. At the control circuit, a data structure is retrieved from a database and the data structure includes a current end-state profile of the customer identifying the current electronic services utilized by the customer. At the control circuit, a set of electronic rules is retrieved from the database. The set of electronic rules are effective to reconcile the current in-state profile with the desired end-state profile. The rules may be in the form of any combination of executable computer code or software data structures. Alternatively, the rules may be stored at the control circuit and not downloaded. The rules may be static or dynamically change over time.

At the control circuit, the desired end-state profile is applied to the data structure according to the set of electronic rules (e.g., computer code is executed) to transform the current state profile in the data structure. The modified data structure conforms to the desired end-state profile.

At the control circuit and using the modified data structure, one or more electronic instructions are formed. The electronic instructions are effective to alter one or more elements in a second electronic communication network that is used to provide services to the consumer and to conform the operation of electronic elements in the second electronic communication network to implement the desired set of electronic services. The transformation of the data structure occurs and/or the electronic rules are applied without involvement, knowledge, or interfacing with the customer.

In aspects, the altering of the element in the network is effective to activate an electronic node, deactivate an electronic node, alter a speed of data service provided by an electronic node, or alter bandwidth of data transmission provided by an electronic node. Other examples of results are possible.

In other aspects, the instructions are created by a billing system. In other examples, the instructions are created by a provisioning system.

In still other aspects, the in-state services include cable services, DVR services, telephone services, internet services, bandwidth settings, and data speed settings. Other examples of services or parameters are possible.

In some examples, the electronic interface is disposed at an internet service provider. In aspects, the customer provides the desired end-state information to the internet service provider.

In others of these embodiments, a system that is configured to provision electronic elements includes a first electronic communication network, a second electronic communication network, a control circuit, a database, and an electronic interface.

The second electronic communication network is configured to provide electronic services according to electronic settings to an electronic media and services customer. The control circuit is disposed at a central location and is coupled to the first electronic communication network and the second electronic communication network. The database is coupled to the control circuit.

The electronic interface is coupled to the first electronic communication network. The electronic interface is configured to receive a desired end-state profile of an electronic media and services customer. The desired end-state profile comprises a set of electronic services desired to be utilized by the electronic media and services customer. The interface is configured to transmit the desired end-state profile to the control circuit via a first electronic communication network.

The control circuit is configured to retrieve from the database a data structure that includes a current end-state profile of the customer identifying the current electronic services utilized by the customer.

The control circuit is further configured to retrieve, from the database, a set of electronic rules. The set of electronic rules is effective to reconcile the current in-state profile with the desired end-state profile. The control circuit is still further configured to apply the desired end-state profile to the data structure according to the set of electronic rules to transform the current state profile in the data structure, such that the modified data structure conforms to the desired end-state profile.

The control circuit is additionally configured to, using the modified data structure, form one or more electronic instructions. The electronic instructions are effective to alter one or more elements in a second electronic communication network that is used to provide services to the consumer and to conform the operation of electronic elements in the second electronic communication network to implement the desired set of electronic services. The transformation of the data structure occurs and/or the electronic rules are applied without involvement, knowledge, or interfacing with the customer.

Figure 1:
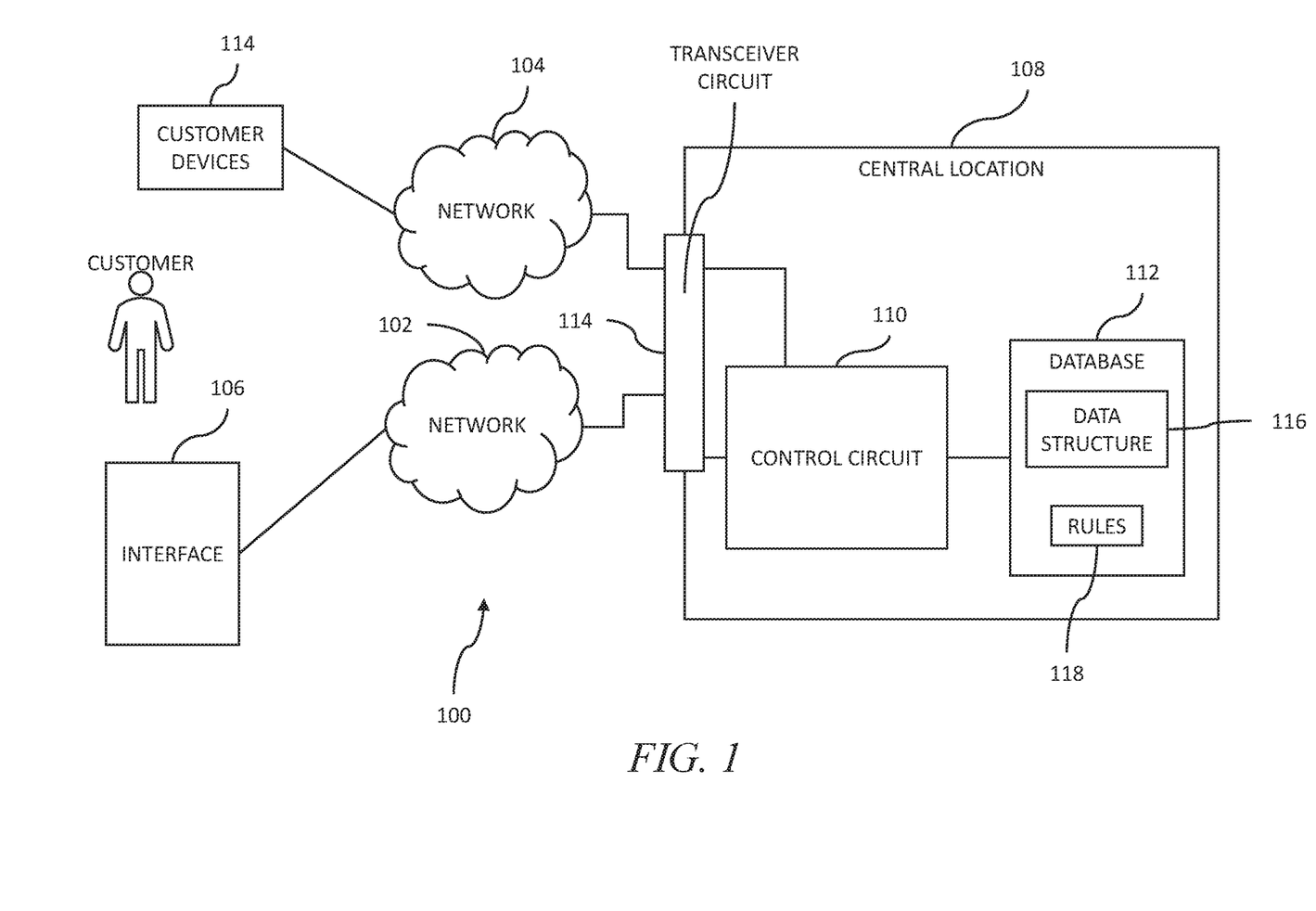
FIG. 1 comprises a diagram of a system as configured in accordance with various embodiments of these teachings.

Referring now to FIG. 1, one example of a system 100 for automatically provisioning electronic communication networks (and/or electronic devices) and invoicing customers is described. The system 100 includes a first electronic communication network 102, a second electronic communication network 104, an electronic user interface 106 (coupled to the first electronic communication network 102 and located remotely from a central location 108), a control circuit 110 (at the central location 108), and a database 112 (at the central location 108). The central location 108 may be a location such as a headquarters, a company home office, or any location that is accessible by multiple users. Customer devices 114 (e.g., devices controlled the customer or at the customer's premises such as smartphones, laptops, cable boxes, modems, or telephones).

As explained in greater detail herein, various functionality is implemented at the central location 108. The choice of a central location advantageously allows these functions to be performed without the knowledge or involvement of customers or users. In so doing, this particular electronic architecture where devices at remote (customer locations) perform some functions while devices at the central location 108 perform other functions allows the system 100 to operate faster and more efficiently than if many (or all of) these functions were, for example, to be performed at remote (customer) locations. Performance of functions in parallel at two locations (and/or also performing functions in parallel at the central location) advantageously increases the operating speed and efficiency of the system, and improves the customer experience since the customer reduces the time they need to interact with the central processing site and can perform other functions and tasks even as the central processing site performs billing, verification, an provisioning functions with no knowledge or interaction required from the customer.

The first electronic communication network 102 and the second electronic communication network 104 are any type of electronic communication networks such as the internet, wireless networks, wide area networks, local area networks, cellular networks, or combinations of these or other networks. In one example, the first electronic communication network 102 comprises the internet and the second electronic communication network 104 is a wireless communication network. Other examples and combinations are possible.

The electronic user interface 106 may be or may be associated with an electronic device (e.g., personal computer, cellular phone, smart phone, laptop, or tablet to mention a few examples) and includes an electronic display and is operated by a user (customer or customer service representative). The screen may be a touch screen or any type of screen that displays information. The interface 106 is coupled to the first electronic communication network 102. The interface 106 may be used directly by the customer to enter information, or by a Customer Service Representative that communicates with a customer (e.g., over a phone line).

A transceiver circuit 114 is disposed at the central location 108. The transceiver circuit 114 is any type of electronic circuit that can transmit and receive electronic information. The transceiver circuit 114 may include buffers, storage, transmitters, and receivers and may be implemented as any combination of computer software or electronic hardware. The transceiver circuit 114 couples the control circuit 110 to the networks 102 and 104.

The database 112 is disposed at the central location 108 and is configured to store the electronic data structure 116.

The database 112 is any type of memory or data storage device that is configured to store information. In examples, the database 112 stores a data structure. In aspects, the data structure 116 represents the current state of the services of a customer (the "in-state" profile or data structure). In some specific examples, the data structure 116 may be a table or tree-like structure. Other examples are possible.

The term "control circuit" refers broadly to any one (or more) microcontrollers, computers, or processor-based devices with processors, memories, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The control circuit 110 may be configured (for example, by using corresponding programming stored in a memory as will be well understood by those skilled in the art) to carry out one or more of the steps, actions, and/or functions described herein.

As mentioned and in aspects, the control circuit 110 is configured to perform various tasks in parallel. For example, the reconciliation process described herein can be performed or executed by the control circuit 110 at the same time that other billing or verification activities are executed. In one example of how this can be accomplished, two different physical electronic processing devices can be operated electronically in parallel with one of the processing devices handling some activities and the other processing device handling other activities. As such, a specialized and specific processing arrangement is formed that advantageously allows multiple electronic activities to occur in parallel and simultaneously, thereby increasing efficiency and operation speed of the system.

As mentioned, the data structure 116 is organized in a particular way, such as a tree-like structure and/or to utilize tables or other data structures showing parent-child relationships of services or service components. In one example, the data structure 116 is organized as a tree-like structure that describes the services purchased, service packages subscribed, offers used, phone numbers, and other information.

When organized as a tree or table, the data structure 116 can be structured as a hierarchy of elements. For example, Customer Y may have an account where they have a service plan and have been accepted under an offer. Customer Y may have a phone line for themselves and a phone line for another person, such as their son or daughter. In this case, a structure may represented as a tree, where the phone line for customer Y is the root node in the tree-like structure and child's phone number (line) is a leaf node extending as a branch from the root node. As described elsewhere herein, a table can also be used for these purposes. This structure represents or signifies that the child's number depends upon the existence of the parent's number. That is, if the parent's number is deleted then the child's number must also be deleted according to the relationship defined by the tree. The present reconciliation approaches map the desired end-state to the appropriate part or parts of the data structure of customer Y that need to be changed. The present reconciliation approaches do so in a particular way that ensure efficient and fast operation of the control circuit 110. The organization of the data structure 116 (as a table or tree) also ensures efficient operation of the control circuit 110.

The control circuit 110 is disposed at the central location and is configured to validate contents of the electronic data structure to transform the electronic data structure into a validated electronic data structure. That is, after the reconciliation process is complete, the current data structure 116 is altered or modified to conform to the desired end-state within the limits imposed by the rules. It will be understood that a physical transformation is made to the electronic data structure 116. For example when a tree-like structure is used, elements in the data structure 116 may be altered by having their branches, leaves, or root nodes deleted or modified. When a table is used, rows of the table can be added or deleted, and/or individual entries in the table can be modified.

The network 104 is physically transformed when provisioned. Provisioning can also include setting or altering the states of switches, routers, or other electronic network elements within the network 104. Additionally, devices at customer premises or with customers (e.g., head ends, modems, cable boxes, smart phones, or other electronic devices) may have their state, configuration, parameters, or other characteristics altered or transformed. Electronic instructions, computer code, electronic parameters or other types of information may be sent to accomplish these results and transformations. In one example, data speeds of data transmissions by electronic elements in the network 104 can be increased or decreased. In yet other aspects, electronic elements within the network 104 are set up or configured to "choke" (or not "choke") data. In still another example, electronic elements in the network 104 may be configured to halt or prevent data or information movement when customer data limits are reached, or customer bills are unpaid.

In aspects, two networks are used: the first electronic communication network 102 and second electronic communication network 104. The first electronic communication network 102 is used to communicate with the central location 108. In examples, the second electronic communication network 104 is separate and distinct from the first network and is the network. In other examples, the first communication network 102 and the second communication network 104 may be the same. The billing system may use these or other networks to communicate with the customer.

The control circuit 110 is configured to retrieve from the database 112 the data structure 116 that includes a current in-state profile of the customer identifying the current electronic services utilized by the customer. The control circuit 110 is further configured to retrieve, from the database 112, a set of electronic rules 118. The set of electronic rules 118 is effective to reconcile the current in-state profile with the desired end-state profile. In aspects, the reconciliation process changes or transforms the data structure 116. The transformed data structure 116 can then be applied to one or more electronic communication networks, where the transformed data structure describes how elements in these networks are altered, transformed, or changed to implement the services to customers specified in the transformed structure. The reconciliation process (and its use at a central location) ensures that global, customer-specific, or other specific rules are enforced and followed. For example, the reconciliation process ensures that required relationships (e.g., parent-child) remain in place or at least are considered. In so doing, changes to the current state data structures are made consistently across multiple customers. Additionally, the reconciliation process ensures that the billing system operates properly since the billing system uses the current in-state profile (that is kept up-to-date as described herein to provision the desired end-state of the customer in real-time).

The rules may be implemented, in examples, as computer instructions executed at the control circuit 110. In aspects, the rules may describe how an item requested by a customer is mapped or matched to an item in the data structure. In one example, a customer Y requests a certain item (e.g., a phone line for customer Y and no other phone line since customer Y does not wish to pay for additional phone lines). However, Customer Y now has an existing phone line for themselves and an additional phone line for person X currently under the same service package of the customer Y. Customer Y wanted person X to directly pay for the additional phone line, so has attached the account number of person X with the additional phone line. The reconciliation process maps the item (a phone line for Customer Y and no additional lines) to the relevant portion or portions of the data structure 116 that describes the item (e.g., a record or other portion in the data structure containing the account number of person X as well as other information). Once mapped, the data structure 116 can be changed to reflect the item.

In another example, this mapping or matching process in aspects is hierarchical in scope and execution. Parameters (e.g., service packages, service offers, billing account numbers, phone lines) are associated with services utilized or subscribed to by customers. In this example, Customer Y has an account with a first phone line and a second phone line with a relative, person X. Each phone line has an associated record specifying information regarding the service. The first phone line (for customer Y) is associated with the package under which it was purchased, the offer under which it was obtained, the billing account number, and the phone number of the line. The second phone line has a similar record. In this example, the package and the offer for the phone line of customer Y and person X are the same, while the account number and phone numbers are different.

In aspects, the parameters are also hierarchal in nature. That is, service packages are higher in scope than offers, which are higher in scope than account numbers, which are higher in scope than phone numbers.

In other aspects, the approach first examines higher level parameters (e.g., look at the packages used by customer Y and person X, in this case, each matches with the package). If there are more than one match for a parameter, the approach examines the next parameter lower in scope (in this case, both customer Y and person X share the same package to yield two matches so look at the next, more specific parameter, in this case, service offers). The next parameter is examined (in this case, both customer Y and person X are associated with the same offer, so there are two matches). This continues down the hierarchy until a parameter obtains a single match is obtained. In this case, the account numbers are next examined so that the record or object associated with person X is found. Only one match is obtained because customer Y has a different account number. The record or object for person X can then be modified to indicate deletion of the phone line for person X. Thus, the request of customer Y has been mapped to an appropriate part of the data structure to make the change demanded by customer Y.

In other aspects and for each input item, all possible matches are identified. The matches are then ordered by the level of the match. In examples, the "best" level of match is determined by the number of the key fields that are matched, in consideration of the stated field matching hierarchy.

For each matched existing input state item, a determination is made as to the input item that has the best match. Since multiple input items could have matched, the best match is selected with the best match defined, in aspects, as by the highest number of the key fields that are matched, in consideration of the stated field matching hierarchy. This best match is then used in the creation of the end state item for the existing service. Since the best match for the existing item is selected, this best match existing item is removed as a candidate matching item from any input item that matched to it.

As mentioned, the present approaches also examine other aspects of the data structure 116 to ensure mistakes are not made. For example, parent-child relationships between objects may be identified and flagged if a problem. In another, that Customer Y wishes to delete their own phone line and does not mention what is to happen to the phone line of person X, where person X is a son or daughter of Customer Y and both lines have the same account number. If a tree indicates that person X depends upon customer Y, then the system will flag (or not allow) the change since it is not desirable (per the tree) to have person X left alone but still being billed for usage.

The control circuit 110 is further configured to, using the modified data structure 116 (that conforms to the end-state), form one or more electronic instructions. The electronic instructions are effective to alter one or more elements in a second electronic communication network 104 that is used to provide services to the consumer and to conform the operation of electronic elements in the second electronic communication network 104 to implement the desired set of electronic services. The transformation of the data structure 116 occurs and/or the electronic rules are applied to the network 104 or the devices 114 without involvement, knowledge, or interfacing with the customer.

The system of FIG. 1 stores multiple types of information at the central location (e.g., at the central tool 112 or server) rather than the information being distributed widely throughout the system. This specific architecture reduces system costs because multiple copies or instances of data do not need to be maintained at multiple locations.

The use of a centralized architecture is more cost-efficient and allows decisions to be made more quickly leading to greater system efficiency. Billing is typically handled centrally and the current state data structure (along with identifiers for services, devices, customers, and so forth) is shared with the billing system (and possibly other systems as well). The billing system may include software programs that use information in the current state data structure to generate electronic invoices for customers using the same identifiers used to provision the network.

Figure 2:
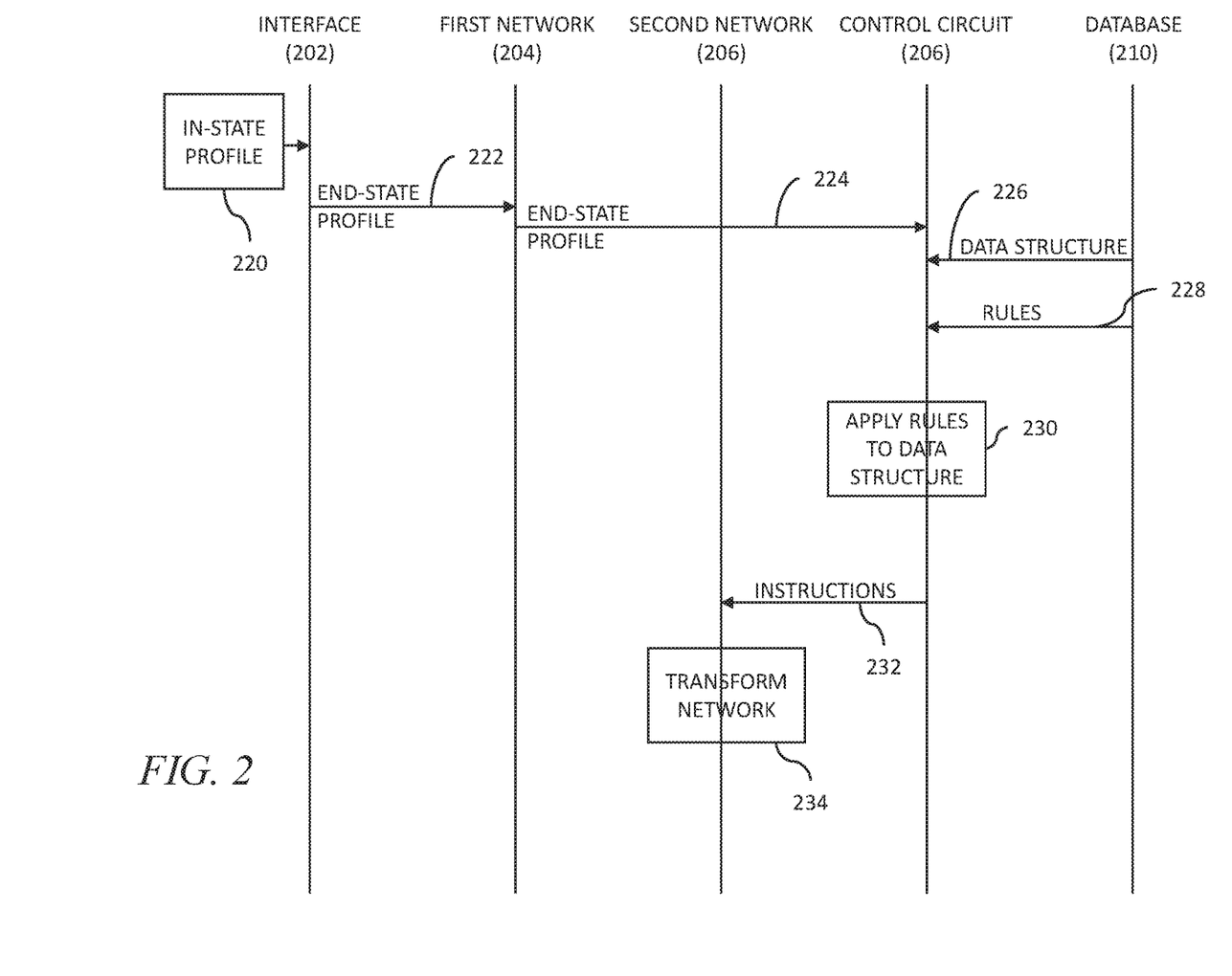
FIG. 2 comprises a flowchart as configured in accordance with various embodiments of these teachings.

Referring now to FIG. 2, one example of an approach that configures elements in an electronic network is described. Various network elements communicate with each other. These elements include a user interface 202, a first network 204, a second network 206, a control circuit 208, and a database 210.

In some examples, the first network 204 provides communications between the interface 202 and the control circuit 208. In some aspects, the first network may be the internet, a cellular phone network, or a combination of these or other networks. The second network 206 is the network having electronic elements that are to be configured to conform to the desired customer end-state.

The interface 202 allows entry of end-state information. This information may be entered manually by a customer or customer service representative using an application (software code) executing at the interface 202.

The control circuit 208 and the database 210 may be disposed at a central location that is separate from the interface 202. The control circuit 208 may execute computer software that implements the steps described herein. These steps perform a reconciliation between the desired end-state of a user and the current state of a user, and configure the network 206 according to the results of the reconciliation. In aspects, reconciliation allows consistent changes to be made to the current data structure, where the changes both conform the current data structure to the desired end-state, but also preserve relationships (e.g., parent-child relationships) that exist between services and service elements. So configured, the modified current state data structure can be shared among multiple software systems (e.g., billing and network configuration where network configuration implements the desired end-state) so that the customer, once they submit an end-state order, does not have to interact with these systems and is not aware of these activities. The use of the common data structure ensures billing and provisioning aspects of the system use consistent and up-to-date information thereby reducing or eliminating errors (e.g., billing errors) due to information mismatch.

The disposition of the control circuit 208 and the database 210 at a central processing location allows the reconciliation process to be hidden from the customer. Additionally, the customer does not have to remember their current state and does not have to perform reconciliation themselves. The customer does not have to identify changes between the services they currently have and their desired (complete) set of services. Consequently, the physical disposition of various network elements and their interconnections offer various advantages of systems having different physical architectures.

At step 220, the desired end-state information is entered by a customer and/or a customer service representative at the interface 202. For example, the customer may entered the services, service packages, offers, phone numbers involved with services, or other types of information relating to the customer's end-state. The end-state refers to the desired services, service packages, relationships between service elements, offers, discounts, phone lines, and any other type of characteristics or results desired by the customer to occur.

At step 222, the end-state information is sent to the first network 204 from the interface. The end-state information, in one example, is an electronic representation of the end-state, for example, a table. The table may be created by an application (e.g., computer software or program) that is executed at the interface 202 and which transforms the information entered by a customer or customer service representative into the electronic data structure. Alternatively, the information is received at the interface 202 but sent to the control circuit 208, which formats the information into an appropriate format.

At step 224, the end-state information is sent to the control circuit 208 via the first network 204. At step 226, a data structure representing the current state of the customer is retrieved from the database 210. At step 228, reconciliation rules may also be retrieved by the control circuit 208 from the data structure 210. Alternatively, the rules may be stored at the control circuit 208. In aspects, the rules are implemented as computer code.

The reconciliation rules are, in one example, implemented as computer instructions that are executed by the control circuit 208. The rules define how comparisons between the desired end-state and the current state are made, changes that are not permitted to the current state, how to preserve hierarchies (e.g., parent-child relationships), and how new services are to be added. At step 230, the reconciliation rules are applied to the end-state and the current state data structure. One result is the modification of the in-state data structure (showing the current in-state) to conform to the desired end-state. Another result of step 230, is that electronic instructions 232 are created that implement the end-state. For example, these instructions 232 may define the operations of network elements such as switches, routers, gateways, or processing elements. In addition these instructions may affect, alter, change, or modify the operations of elements on customer premises or at the customer such as modems, phones, cellular phones, head ends, or cable boxes. At step 234, network elements or electronic devices at customer premises (or associated with the customer) are physically transformed (e.g., from one state to another such as by operating switches).

Figure 3:
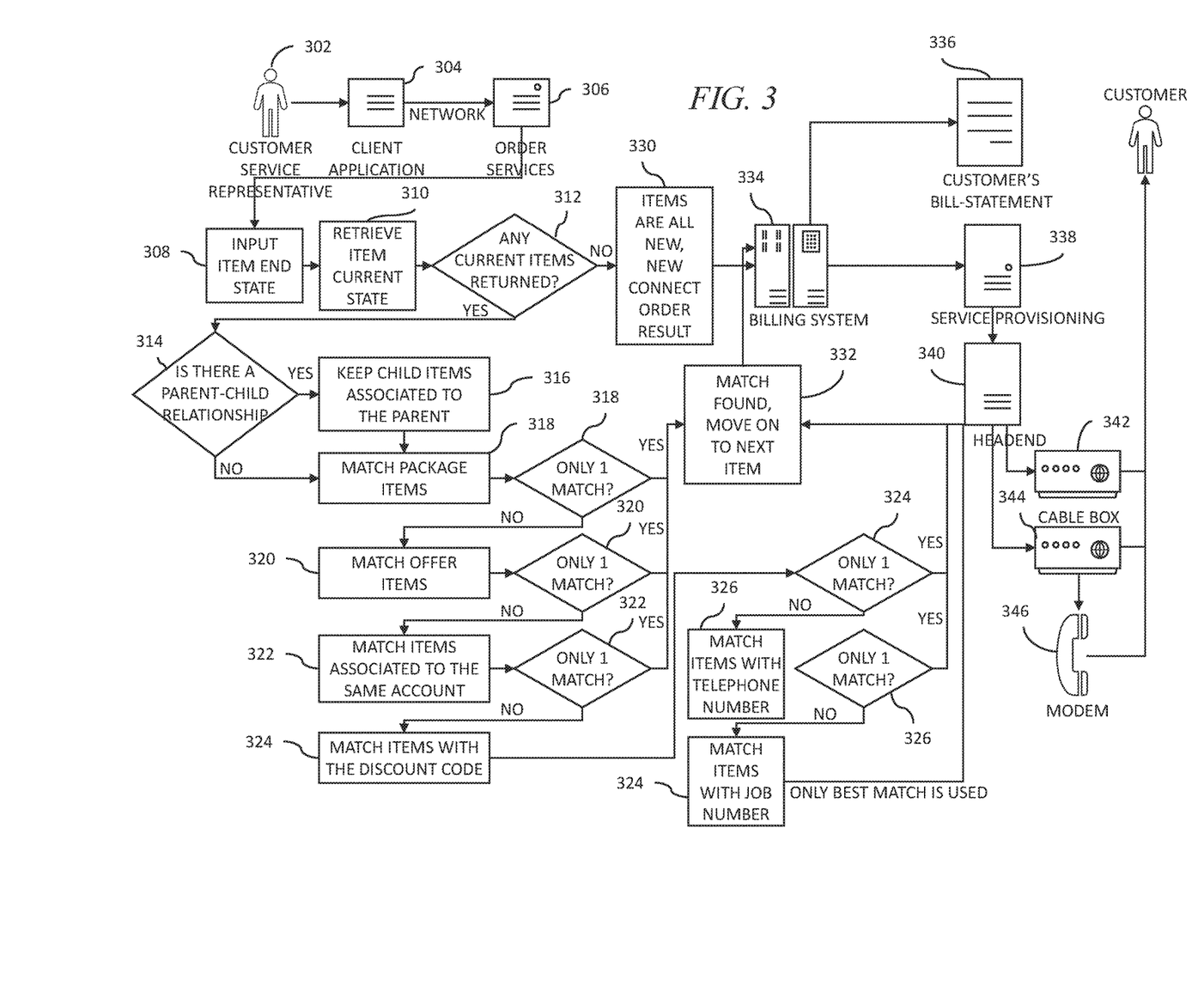
FIG. 3 comprises a flow diagram as configured in accordance with various embodiments of these teachings.
Figure 4:
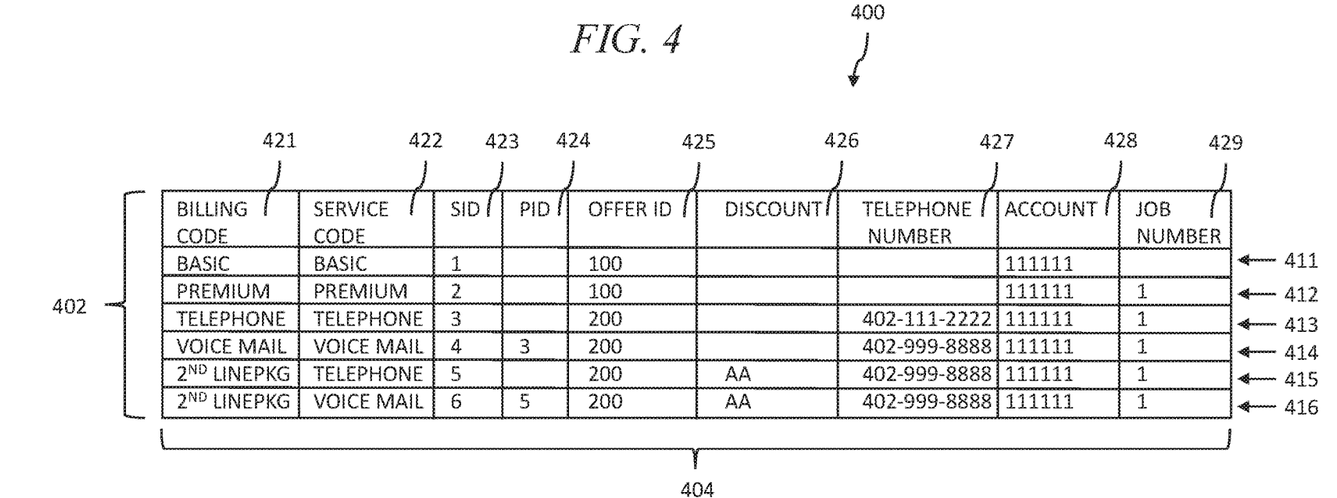
FIG. 4 comprises a diagram as configured in accordance with various embodiments of these teachings.
Figure 5:
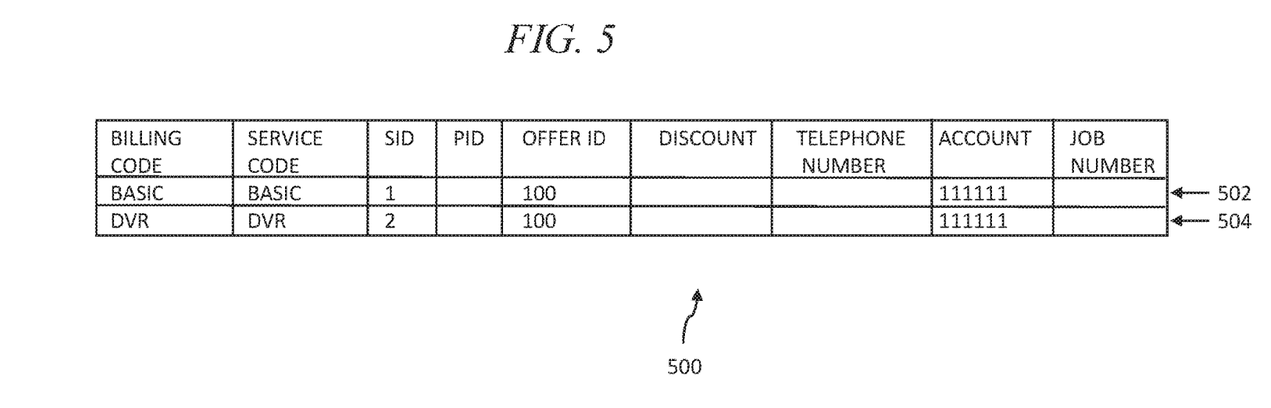
FIG. 5 comprises a diagram as configured in accordance with various embodiments of these teachings.

Referring now to FIG. 3, FIG. 4, and FIG. 5, one example of an approach that configures a network is described. At step 302, a Customer Service Representative (CSR) receives a call from a customer requesting a change to their account. Alternatively, an electronic receiver device receives an electronic request directly from a customer to change their account (e.g., from the internet).

A Client Application 304 at an interface (e.g., interface 106 of FIG. 1) may be used by the CSR (or the electronic receiver device) to obtain the desired end-state of the customer. The customer, in one example, informs the CSR that they have "Basic" video and a "DVR" equipment service today but want to remove the "DVR" and add a "Premium" channel to view additional video content, a "Telephone" service to make phone calls along with a "Voice Mail" service to record messages from missed calls, and a second phone line "Telephone" also with a "Voice Mail" service for an in-home business. Using the client application, the CSR removes "DVR" and adds "Premium", "Telephone", "Voice Mail", "Telephone", and "Voice Mail" services to the customer's electronic shopping cart, which can be displayed on a screen to the customer or the customer service representative.

Referring now especially to FIG. 4, an electronic shopping cart 400 of the present example is shown. The shopping cart 400 may be implemented as a table data structure that includes rows 402 and columns 404. Each of the rows 402 is a particular service offering and each of the columns is a feature, characteristic, or descriptor of the service offering. Row 411 is basic service, row 412 is premium service, row 413 is telephone service, row 414 is voicemail, row 415 is a second line package (telephone) and line 416 is second line package (voicemail).

Column 421 represents a billing code, column 422 represents a service code, column 423 represents a service ID (SID), column 424 represents a parent ID (PID) of the parent of the entry, e.g., voice mail has a parent of telephone, and voice mail, column 425 represents an offer ID, column 426 represents discount, column 427 represents telephone number, column 428 represents account number, and column 429 represents a job number.

Referring now especially to FIG. 5, the current state (in-state) data structure 500 of the customer account is shown. The current state (in-state) includes the same columns as that of the end-state shown in FIG. 4. In the example of FIG. 5, two rows 502 and 504 exist for two services (Basic and DVR) currently subscribed to by the customer. It will be appreciated that that the current state data structure 500 is used by the billing system to generate bills to the customer. For example, customer numbers and billing codes may be shared and used in common. The billing system may map customer service usage to the services in the table that have been subscribed to by the customer. Thus, the current state data structure 500 is shared between provisioning and billing systems.

Referring now again collectively to FIG. 3, FIG. 4, and FIG. 5, client application, which capture the end customer's "end-state". In this example, the Customer has "Basic" video and "DVR" services and desires removing "DVR" and adding a new "Premium", "Telephone", "Voice Mail", "Telephone", and "Voice Mail" service.

At step 306, a call is made to a centralized control circuit or processing system (that implements order services software) and this call or electronic communication includes a complete end-state request providing "Basic", "Premium", "Telephone", "Voice Mail", "Telephone", and "Voice Mail" services in the shopping cart of the request.

At the control circuit at the central processing system (the order services software), the request from the client application is received, containing the desired end-state of the order. The request message contains "Basic", "Premium", "Telephone", "Voice Mail", "Telephone", and "Voice Mail" services in the shopping cart of the request.

The input item end-state 308 is the order received and includes "Basic", "Premium", "Telephone", "Voice Mail", "Telephone", and "Voice Mail" services. All of these services are included to reconcile.

At step 310, the item current state is retrieved from a database at the central processing center. In these regards, a call is made (e.g., from Order Services software) to the billing system to return a data structure representing the customer's current services (e.g., FIG. 5). The billing system returns "Basic" and "DVR" as the current active services. The billing service may be a software program (or programs) and utilize the associated data structure (e.g., data structure 500) to provide billing services (e.g., invoices) for customers.

At step 312, a determination is made at the control circuit executing the order services software as to whether there are any current items returned with matching service code. The control circuit that is executing the order services software compares the "Basic" and "DVR" services returned by the billing system against the request sent by the client application noting if the item is a match. In this case, "Basic" is an equal match with only one occurrence of the service found in both the end-state request along with the current services returned from the billing system. If no unique matches are found, control will proceed with step 330 as described below. Otherwise and as described herein, steps 314-328 may be performed with respect to all remaining services in the shopping cart 400. These steps as well as steps 306-312, 330, and 332 may be performed by Order Services Software.

At step 314, the Order Services Software is executed by the control circuit and connects to the provisioning database to identify any parent and child relationships between the services. In this case, a relationship between "Telephone" and "Voice Mail" exists. If the customer already had "Telephone" and "Voice Mail" on their account, these would be detected as a match and the current items kept versus being considered new or required removal.

If the answer at step 314 is affirmative, at step 316 the system keeps child items associated to the parent. When the services are sent with an end-state, each "Telephone" and "Voice Mail" service has an established parent and child indicator via a numerical value assigned. In this case as shown by element 400, the first instance of "Voice Mail" is associated to the first instance of "Telephone". These two services will be kept together when looking for existing services matching on the account. Since no existing "Telephone" services exist, these would be found as new services and added.

If the answer at step 314 is negative, at step 318 the system matches package items. More specifically and when a service is configured in a packaged set of services at a cheaper rate, the system will review all services to detect this condition and keep these items together in the same package container. In this case, a package is detected yet it is new and was not listed in the current state. In this case, the "$2^{nd}$ LinePkg" package would be newly added. If this "2nd LinePkg" were already on the current customer, it would have been identified as a match and kept versus being newly added. If only one match exists, the execution continues at step 332. Continuing at step 332 means that a match has been found and no further looking/comparing is needed so the matching process is exited and the changes needed for that item are applied to match the end state.

At step 320, the system matches offer items. Any service associated to an offer is to be matched against similar services within the same offer. Since the offer ID for the "Basic" service matches these are considered the same products. This will not always impact the order as it may be possible for the same "Basic" service to be moved to a new offer where the offer ID is simply updated to a new value versus discounting it as not a match and thinking it should be removed and a new "Basic" service added. This is a transition from one offer to another washing some of the differences if the only difference is due to the offer id itself. If only one match exists, the execution continues at step 332.

At step 322, the system matches items associated with the same account. The services on the customer in this case is all related to the same billing account, therefore no duplicate services were found against different account numbers requiring this step to locate a match. This check only takes effect when multiple billing accounts are present with identical services. For example, if the two telephone lines were billed to two different people such as a main telephone and one being paid for by a live-in grandparent. In this case, if a change was made to "Telephone" and neither "Telephone" services were in a package the system would need to detect which billing account the change was made for finding a match based on the person being billed. If only one match exists, the execution continues at step 332.

At step 324, the system matches items with a discount code. Since there are some services in the list with a discount code applied, this can also be a uniquely identifying factor. Since in this example these services are in different package, a match was already found. If they were not in a package it may be possible to match these against the services having a discount code versus others who do not. If only one match exists, the execution continues at step 332.

At step 326, the system matches items with a telephone number. Since there are some services in the list with a different telephone number applied, this can also be a uniquely identifying factor. Since these services are in a different package, a match was already found. If there happened to not be in a package, it may be possible to match these against the services having the same telephone number associated. If only one match exists, the execution continues at step 332.

At step 328, the system matches items with a job number. Since there are some services in the list with a job number associated, this value could be used to understand if duplicate items were found.

Step 330 is executed when items are all new and there is a new connect order result. When a customer does not already have existing services, then any services sent in the end-state would not find any matches and is immediately processed as a new connect order.

Step 332 is executed when a match is found and then the system moves on to the next item in the end-state order. In other words, any time a unique match is found the system will keep the service and move onto the next service (or element) to attempt finding a match. This continues until a unique match is identified to accurately reconcile the order (or until all items in the end-state order are examined). After all items in the order are processed, the billing system can be accessed to perform billing functions and a provisioning system is used to implement the services at one or more networks or devices of the customer. After reconciliation of all elements in an order, the data structure 500 is changed to conform to the data structure 400. In some examples, data structure 400 simply becomes the data structure 500, while in other examples the data structure 400 is modified.

At step 334, functions of a billing system is executed. This is where services are processed to be applied to a bill and to deliver the service to the customer.

At step 336, a customer bill is created. In aspects, a billing statement is a physical paper the customer receives in the mail or an electronic bill received via email communicating how much money the customer owes for the current active services they are receiving.

At step 338, service provisioning occurs. In aspects, middleware systems orchestrate the required steps to understand which services are being rendered and communicate the appropriate messages to devices on the network. Various electronic elements described below (and potentially others as have been described elsewhere herein) may be altered, modified, or transformed.

In these regards, a headend 340 is a node on the network and receives a service activation or deactivation request. Additionally, a cable box 342 is a physical device in the home of the customer attached to the network receiving the service. In this case, the "Basic" and "Premium" video services would be displayed on their TV via the Cable box device. Furthermore, a modem 344 is a physical device in the home of the customer attached to the network receiving the service. In this case, the "Telephone" and "Voice Mail" services would be activated via the Modem device for Voice over Internet Protocol (VoIP) phone technology. Also, a phone 346 is typically a customer-purchased device connected to the modem supplying the customer with an ability to use the phone service making connecting calls to other phones across a network to communicate vocally.

Referring now to FIGS. 6, 7, 8, 9, and 10, aspects of the end state matching process are described. These figures show various tables representing service states of customers, including rows with each row being an item or service. Key fields define each of the items (services) including service codes, package codes, offer identifiers (ID), and discount identifiers (ID). It will be appreciated that in these examples the number of key fields has been minimized to more easily illustrate the processing and that other key fields are possible. Key fields can also be ranked in order of importance. In aspects, the service code is the most important factor and must match as between an end state service and an existing service to match. FIGS. 6, 7, 8, 9, and 10 show aspects of a process that creates a final requested end state table (table 1000 in FIG. 10), which can be utilized to manually or automatically implement the services at or in a network.

As mentioned, the key fields include the service code, package code, offer ID, and discount ID. The ranking order, in one example, represents a hierarchy, with the service code being the highest factor in a match (and, in aspects, is a required factor in a match), the package code (for a service package offering), the second highest factor or consideration, the offer ID (for a particular offer) being the next highest consideration or factor, and a discount ID (identifying a particular discount being offered for a service or services) being the least important factor. Other rankings are possible.

Figure 6:
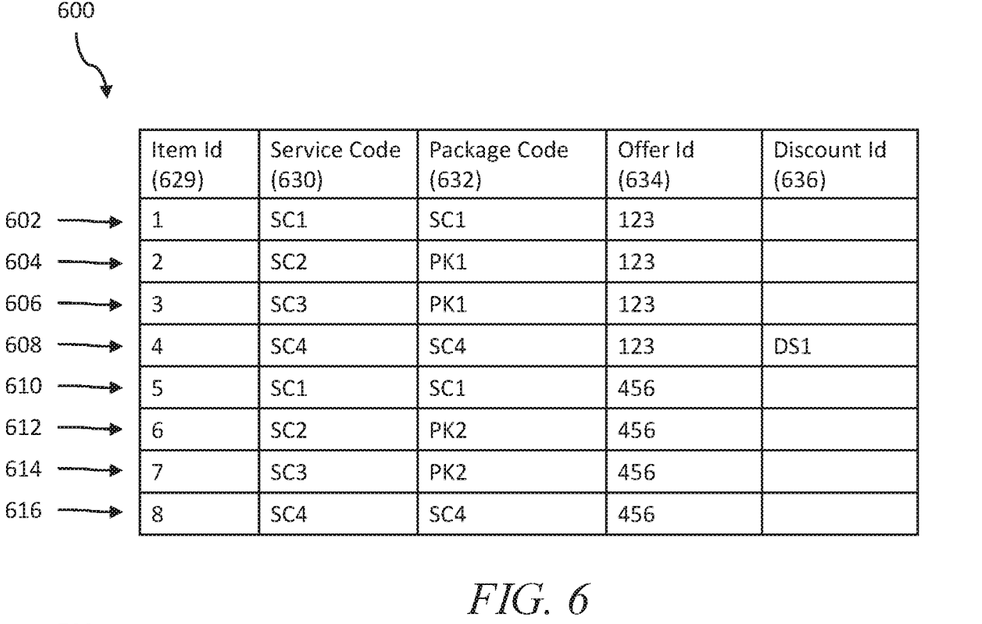
FIG. 6 comprises a diagram as configured in accordance with various embodiments of these teachings.
Figure 7:
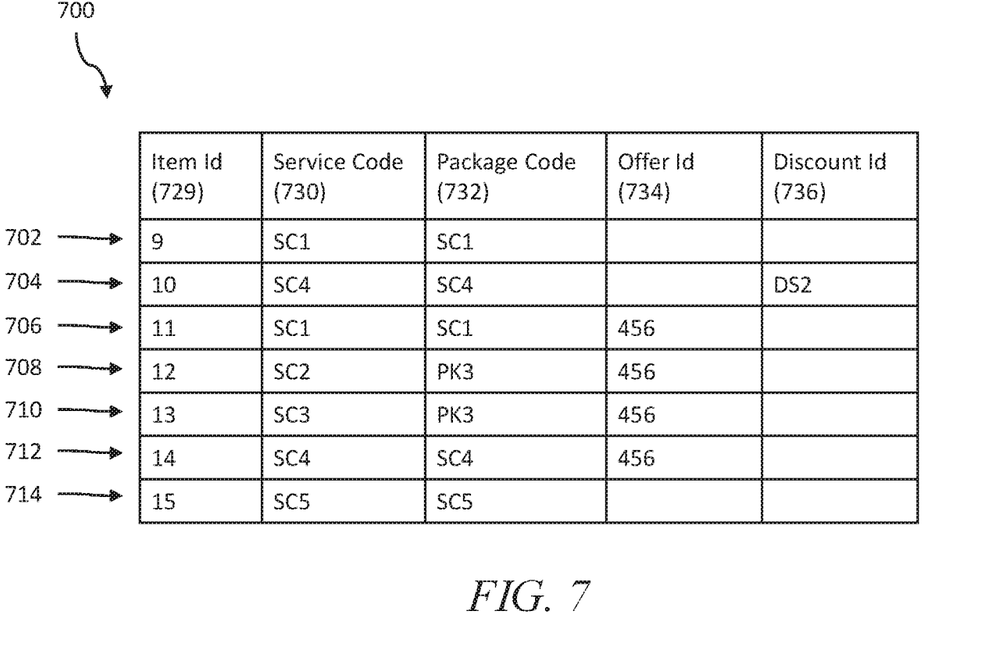
FIG. 7 comprises a diagram as configured in accordance with various embodiments of these teachings.
Figure 8:
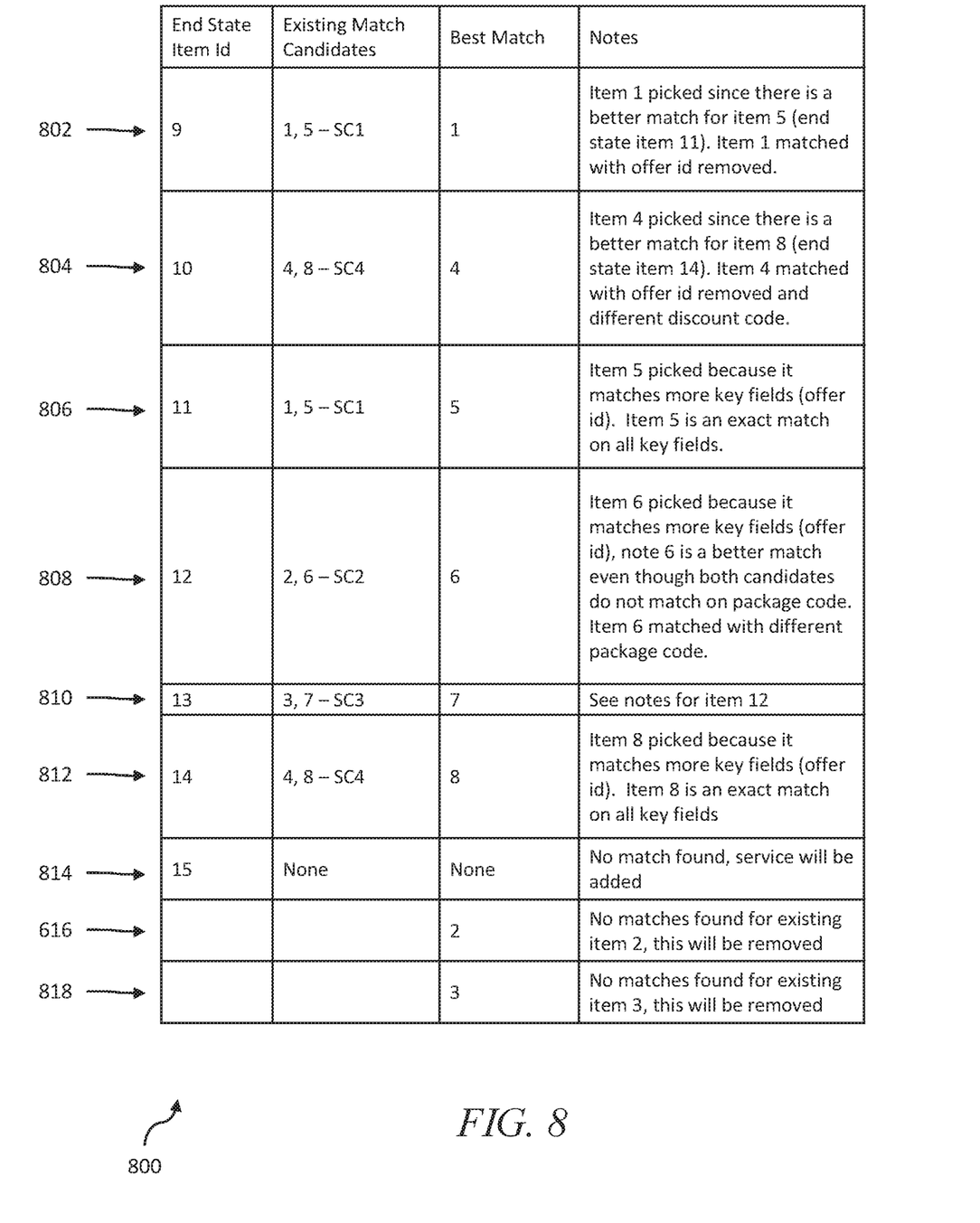
FIG. 8 comprises a diagram as configured in accordance with various embodiments of these teachings.
Figure 9:
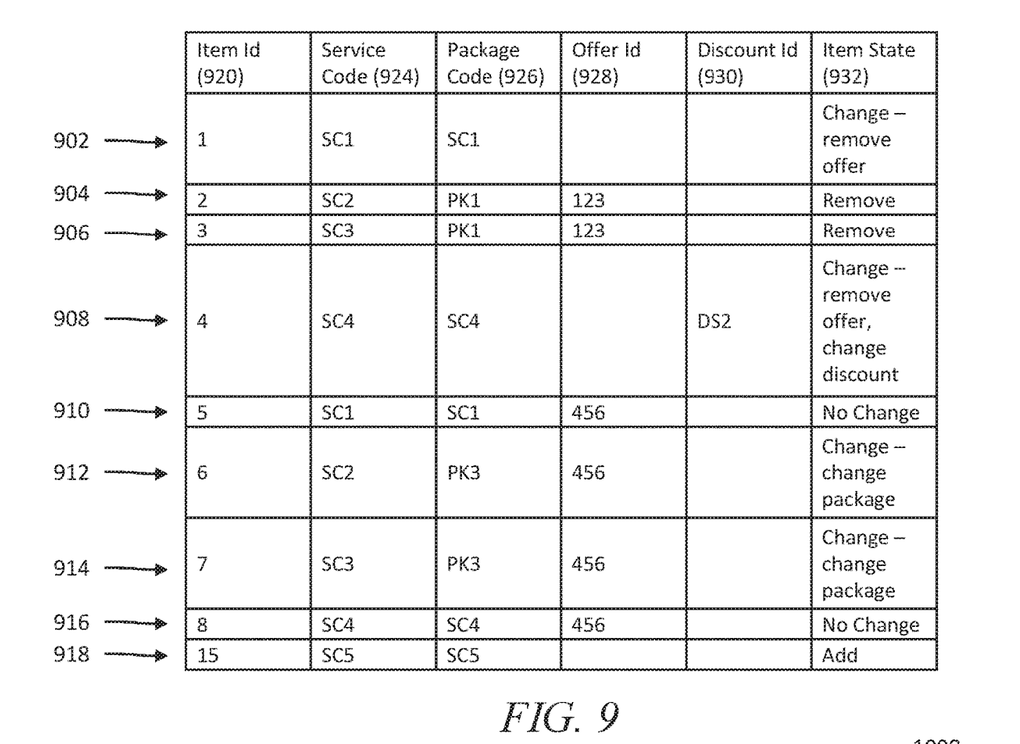
FIG. 9 comprises a diagram as configured in accordance with various embodiments of these teachings.
Figure 10:
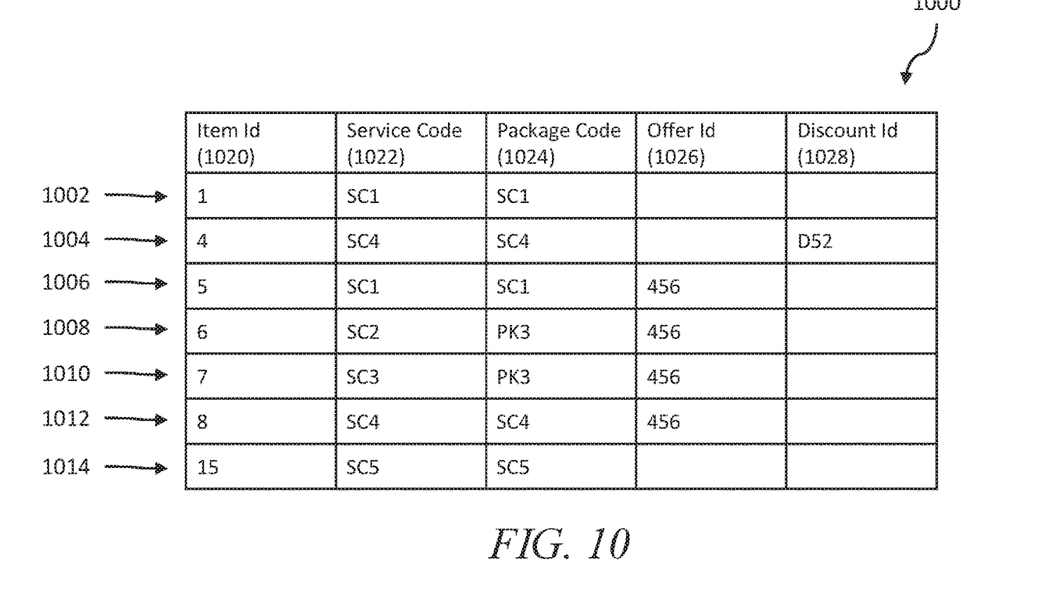
FIG. 10 comprises a diagram as configured in accordance with various embodiments of these teachings.

Generally speaking, FIG. 6 represents current offerings, FIG. 7 represents a desired end state, FIG. 8 represents the end state matching process, FIG. 9 represents the ordered items in conformance with the desired end state, and FIG. 10 is a table showing the desired end states with current items matched to desired items. As shown in these examples, it is desired to determine if any of the desired end state items match current state items. The matching process is undertaken in order to minimize the time to achieve the end state, the effort to achieve the end state, and amount of disruption to the system to accomplish and implement the desired end state items. In aspects, the matching process eliminates re-implementing existing services and minimizes service disruptions to customers.

Referring now specifically to FIG. 6, a table 600 represents an existing or current state for a customer. The table 600 has rows 602, 604, 606, 608, 610, 612, 614, and 616, representing services now (currently) used, subscribed to, ordered by, or utilized by the customer. The table 600 has columns 629, 630, 632, 634 and 636 representing key fields, which describe or define a particular service. The column 629 is the item ID field. The column 630 is the service code. The column 632 is the package code. The column 634 is the offer ID. The column 636 is the discount ID.

Row 602 has an item ID of 1, with service code SC1, package code SC1, offer ID 123, and no discount ID.

Row 604 has an item ID of 2, with service code SC2, package code PK1, offer ID 123, and no discount ID.

Row 606 has an item ID of 3, with service code SC3, package code PK1, offer ID 123, and no discount ID.

Row 608 has an item ID of 4, with service code SC4, package code SC4, offer ID 123, and discount ID DS1.

Row 610 has an item ID of 5, with service code SC1, package code SC1, offer ID 456, and no discount ID.

Row 612 has an item ID of 6, with service code SC2, package code PK2, offer ID 456, and no discount ID.

Row 614 has an item ID of 7, with service code SC3, package code PK2, offer ID 456, and no discount ID.

Row 616 has an item ID of 8, with service code SC4, package code SC4, offer ID 456, and no discount ID.

Referring now specifically to FIG. 7, a table 700 represents a desired end state for a customer. In other words, the table 700 represents the set of services desired by the customer and includes changes from the table 600. The table 700 has rows 702, 704, 706, 708, 710, 712, and 714, representing services desired to be used, subscribed to, ordered by, or utilized by the customer in the future. The table 700 has columns 729, 730, 732, 734 and 736 representing key fields (the same key fields as table 600), which describe or define a desired service. The column 729 is the item ID field. The column 730 is the service code. The column 732 is the package code. The column 734 is the offer ID. The column 736 is the discount ID. It is one goal of the present approaches to compare table 700 to table 600 in order to determine if any of the desired services are actually currently being used (i.e., in the current state table 600).

Row 702 has an item ID of 9, with service code SC1, package code SC1, no offer ID, and no discount ID.

Row 704 has an item ID of 10, with service code SC4, package code PK1, no offer ID, and a discount ID of DS2.

Row 706 has an item ID of 11, with service code SC1, package code PK1, offer ID 456, and no discount ID.

Row 708 has an item ID of 12, with service code SC2, package code SC4, offer ID 456, and no discount ID.

Row 710 has an item ID of 13, with service code SC3, package code SC1, offer ID 456, and no discount ID.

Row 712 has an item ID of 14, with service code SC4, package code PK2, offer ID 456, and no discount ID.

Row 714 has an item ID of 15, with service code SC5, package code PK2, no offer ID, and no discount ID.

One goal of these approaches is to match or reconcile the items desired in table 700 to the existing service shown in table 600. The match or reconciliation process ensures that as states change, minimum disruption to the customer occurs.

Turning now to FIG. 8, a table 800 is shown that illustrates aspects of the matching and reconciliation process. The table 800 includes rows 802, 804, 806, 808, 810, 812, 814, 816, and 818 corresponding to the rows 702, 704, 706, 708, 710, 712 and 714 in the table 700. A first column 820 represents an end state item ID, a second column 804 represents existing best match candidates taken from the table 600, a third column 806 represents the best match, and the fourth column 808 describes control logic used to determine the best match identified in column 806.

For row 802 (end state item 9), item 1 (from table 600) is selected as the best match since there is a better match for item 5 (the better match for item 5 being end state item 11 from table 700). End state item 9 is matched with existing item 1 with the offer ID removed.

For row 804 (end state item 10), item 4 (from table 600) is selected as the best match since there is a better match for item 8 (the better match for item 8 is end state item 14 from table 700). End state item 10 is matched with existing item 4 with the offer ID removed and a different discount code (DS2) added.

For row 806 (end state item 11), item 5 (from table 600) is selected as the best match since it matches more key fields (e.g., offer ID). End state item 11 is matched with existing item 5 and item 5 is an exact match since it matches on all key fields.

For row 808 (end state item 12), item 6 (from table 600) is selected as the best match since it matches more key fields (e.g., offer ID). Item 6 is a better match even though both candidates do not match on the package code. End state item 12 is matched with existing item 6 with a different package code.

For row 810 (end state item 13), item 7 (from table 600) is selected as the best match since it matches more key fields (e.g., offer ID). Item 7 is a better match even though both candidates do not match on the package code. End state item 13 is matched with existing item 7 with a different package code.

For row 812 (end state item 14), item 8 (from table 600) is selected as the best match since it matches more key fields (e.g., offer ID). End state item 14 is matched with existing item 8 and item 8 is an exact match on all key fields.

For row 814 (end state item 15), no match is found. Consequently, this item will be added.

There are no matches for existing items 2 and 3 (rows 816 and 818). Consequently, these items are removed from consideration.

It will be appreciated that the factors determining a "best" match may be changed to reflect to reflect various desires, and in this example, is defined by matching results of the key fields. The algorithm used to determine a best match may be implemented as computer code, in one example and use any of the data structures described with respect to FIGS. 6, 7, 8, 9, and 10.

Referring now to FIG. 9, the output of the control logic described with respect to FIG. 8 is shown as a table 900. The table 900 orders items to achieve the requested end state. It will be appreciated that this table and the control logic described can be implemented as executable computer instructions executed by a control circuit and/or an appropriate data structure (e.g., a table). The table 900 in FIG. 9 may be created as a result of performing the actions of FIG. 8.

The table 900 includes rows 902, 904, 906, 908, 910, 912, 914, 916, and 918. Each row represents a potential item in the requested end state. Column 920 represents the item number; column 922 represents the service code; column 924 represents the package code; column 926 represents the offer ID; column 928 represents discount ID; and column 930 represents the item state. The item state 900 explains the action that will be performed on a row. For example, row 902 will have its offer changed, and rows 904 and 906 will be removed from the final table.

Referring now to FIG. 10, the final table 1000, with the actions (described in FIG. 9 taken) is shown. The table 1000 includes rows 1002 (corresponding to row 902 in table 900), 1004 (corresponding to row 908 in table 900), 1006 (corresponding to row 910 in table 900), 1008 (corresponding to row 912 in table 900), 1010 (corresponding to row 914 in table 900), 1012 (corresponding to row 916 in table 900), and 1014 (corresponding to row 918 in table 900).

Column 1020 represents the item number; column 1022 represents the service code; column 1024 represents the package code; column 1026 represents the offer ID; and column 1028 represents discount ID. It can be seen that rows 904 and 906 are not present in table 1000 since they have been removed.

Since the table 1000 is finalized, it can be used (e.g., by a control circuit) to implement the items described in the table 1000. As mentioned, electronic instructions can be created that implement, for example, the services described in the table 1000. It can be seen that some service listings have been at least partially re-used from the initial table 600. In aspects, re-using a service may not require the service to be re-implemented or re-configured onto or into a network (since the service already exists). Consequently, changes to the network (that implements services to a customer) and/or service disruptions to customers are minimized thereby reducing costs and increasing system efficiency.

Preferred embodiments of this disclosure are described herein, including the best mode known to the inventor(s). It should be understood that the illustrated embodiments are exemplary only and should not be taken as limiting the scope of the appended claims.

What is claimed is:

1. A method of provisioning electronic elements, the method comprising:

receiving at an electronic interface, a desired end-state profile of an electronic media and services customer comprising a set of electronic services desired to be utilized by the electronic media and services customer;

transmitting the desired end-state profile to a control circuit that is disposed at a central location via a first electronic communication network;

at the control circuit, retrieving from a database a data structure that includes a current in-state profile of the customer identifying the current electronic services utilized by the customer;

at the control circuit, retrieving, from the database, a set of electronic rules, the set of electronic rules effective to reconcile the current in-state profile with the desired end-state profile;

at the control circuit, applying the desired end-state profile to the data structure to produce a modified data structure according to the set of electronic rules to transform the current in-state profile in the data structure, such that the modified data structure conforms to the desired end-state profile;

at the control circuit and using the modified data structure, forming one or more electronic instructions, the electronic instructions being effective within a provisioning system to alter one or more elements in a second electronic communication network that is used to provide services to the consumer and to conform the operation of electronic elements in the second electronic communication network to implement the desired set of electronic services;

such that the electronic rules are applied without involvement, knowledge, or interfacing with the customer;

wherein the data structure comprises a first list of the current electronic services, and each of the current electronic services on the first list are defined by key fields, and wherein the key fields are ranked according to a ranking by order of importance;

wherein the end-state profile includes a second list of the electronic services desired to be utilized by the customer, and each of the desired electronic services on the second list are defined by the key fields;

wherein applying the end state profile comprises comparing the key fields of the second list of the desired electronic services to the key fields of the first list of current electronic services to yield a comparison, the comparison producing a number of matches between the desired electronic services and the current electronic services;

when the comparison yields no matches between a selected current electronic service and any of the desired electronic services indicating that the selected current electronic service is no longer desired by the customer, the first selected current electronic service is removed from the data structure;

when the comparison yields no matches between a first selected desired electronic service and any of the current electronic services indicating that the first selected desired electronic service is a new service desired by the customer, the first selected desired electronic service is added to the data structure;

wherein the comparison identifies all possible matches in consideration of the ranking between a second selected desired electronic service and the current electronic services, and the matches are ordered by a level of match, the level of match determined by the number of key fields that match between the second selected desired electronic service and current electronic services, and wherein a matching current electronic service is determined from all the possible based upon the level of match, the matching current electronic service being retained or modified in the data structure;

wherein when a selected current electronic service is indicated to be dropped, and the selected current electronic service is a parent of a child service that has not been indicated to be dropped, the selected current electronic service is maintained;

wherein the same key fields are used in both a billing system to generate customer bills and in the provisioning system to alter the one or more elements in a second electronic communication network, usage of the same key fields being effective so as to both maximize accuracy of customer bills and provisioning the second network.

2. The method of claim 1, wherein the altering is effective to activate an electronic node, deactivate an electronic node, alter a speed of data service provided by an electronic node, or alter bandwidth of data transmission provided by an electronic node.

3. The method of claim 1, wherein the services include cable services, DVR services, telephone services, internet services, bandwidth settings, and data speed settings.

4. The method of claim 1, wherein the electronic interface is disposed at an internet service provider.

5. The method of claim 4, wherein the customer provides the desired end-state information to the internet service provider.

6. A system that is configured to provision electronic elements, the system comprising:

a first electronic communication network;

a second electronic communication network that is configured to provide electronic services according to electronic settings to an electronic media and services customer;

a control circuit disposed at a central location and coupled to the first electronic communication network and the second electronic communication network;

a database coupled to the control circuit;

an electronic interface coupled to the first electronic communication network, the electronic interface configured to receive a desired end-state profile of an electronic media and services customer, the desired end-state profile comprising a set of electronic services desired to be utilized by the electronic media and services customer, wherein the interface is configured to transmit the desired end-state profile to the control circuit via a first electronic communication network;

wherein the control circuit is configured to:

retrieve from the database a data structure that includes a current in-state profile of the customer identifying the current electronic services utilized by the customer;

retrieve, from the database, a set of electronic rules, the set of electronic rules effective to reconcile the current in-state profile with the desired end-state profile;

apply the desired end-state profile to the data structure to produce a modified data structure according to the set of electronic rules to transform the current in-state profile in the data structure, such that the modified data structure conforms to the desired end-state profile;

using the modified data structure, form one or more electronic instructions, the electronic instructions being effective within a provisioning system to alter one or more elements in a second electronic communication network that is used to provide services to the consumer and to conform the operation of electronic elements in the second electronic communication network to implement the desired set of electronic services;

such that the electronic rules are applied without involvement, knowledge, or interfacing with the customer;

wherein the data structure comprises a first list of the current electronic services, and each of the current electronic services on the first list are defined by key fields, and wherein the key fields are ranked according to a ranking by order of importance;

wherein the end-state profile includes a second list of the electronic services desired to be utilized by the customer, and each of the desired electronic services on the second list are defined by the key fields;

wherein applying the end state profile comprises comparing the key fields of the second list of the desired electronic services to the key fields of the first list of current electronic services to yield a comparison, the comparison producing a number of matches between the desired electronic services and the current electronic services;

when the comparison yields no matches between a selected current electronic service and any of the desired electronic services indicating that the selected current electronic service is no longer desired by the customer, the first selected current electronic service is removed from the data structure;

when the comparison yields no matches between a first selected desired electronic service and any of the current electronic services indicating that the first selected desired electronic service is a new service desired by the customer, the first selected desired electronic service is added to the data structure;

wherein the comparison identifies all possible matches in consideration of the ranking between a second selected desired electronic service and the current electronic services, and the matches are ordered by a level of match, the level of match determined by the number of key fields that match between the second selected desired electronic service and current electronic services, and wherein a matching current electronic service is determined from all the possible based upon the level of match, the matching current electronic service being retained or modified in the data structure;

wherein when a selected current electronic service is indicated to be dropped, and the selected current electronic service is a parent of a child service that has not been indicated to be dropped, the selected current electronic service is maintained;

wherein the same key fields are used in both a billing system to generate customer bills and in the provisioning system to alter the one or more elements in a second electronic communication network, usage of the same key fields being effective so as to both maximize accuracy of customer bills and provisioning the second network.

7. The system of claim 6, wherein the transformation of the data structure is effective to activate an electronic node, deactivate an electronic node, alter a speed of data service provided by an electronic node, or alter bandwidth of data transmission provided by an electronic node.

8. The system of claim 6, wherein the services include cable services, DVR services, telephone services, internet services, bandwidth settings, and data speed settings.

9. The system of claim 6, wherein the electronic interface is disposed at an internet service provider.

10. The system of claim 9, wherein the customer provides the desired end-state information to the internet service provider.

* * * * *